(12) United States Patent
Zlatokrilov

(10) Patent No.: US 10,142,426 B2
(45) Date of Patent: Nov. 27, 2018

(54) SYSTEM AND METHOD FOR IDENTIFYING COMMUNICATION SESSION PARTICIPANTS BASED ON TRAFFIC PATTERNS

(71) Applicant: VERINT SYSTEMS LTD., Herzliya Pituach (IL)

(72) Inventor: Haim Zlatokrilov, Tel Aviv (IL)

(73) Assignee: VERINT SYSTEMS LTD., Herzliya, Pituach (IL)

( * ) Notice: Subject to any disclaimer, the term of this patent is extended or adjusted under 35 U.S.C. 154(b) by 261 days.

(21) Appl. No.: 15/084,408

(22) Filed: Mar. 29, 2016

(65) Prior Publication Data

US 2016/0285978 A1    Sep. 29, 2016

(30) Foreign Application Priority Data

Mar. 29, 2015 (IL) .......................................... 238001

(51) Int. Cl.
*H04L 29/08* (2006.01)
*H04L 12/851* (2013.01)
*H04L 12/859* (2013.01)

(52) U.S. Cl.
CPC ........ *H04L 67/146* (2013.01); *H04L 47/2475* (2013.01); *H04L 47/2483* (2013.01)

(58) Field of Classification Search
CPC ............. H04L 47/2475; H04L 47/2483; H04L 67/146
USPC ....................................................... 709/224
See application file for complete search history.

(56) References Cited

U.S. PATENT DOCUMENTS

| | | |
|---|---|---|
| 5,689,442 A | 11/1997 | Swanson et al. |
| 6,404,857 B1 | 6/2002 | Blair et al. |
| 6,718,023 B1 | 4/2004 | Zolotov |
| 6,741,992 B1 | 5/2004 | McFadden |

(Continued)

FOREIGN PATENT DOCUMENTS

WO    2012/075347    6/2012

OTHER PUBLICATIONS

Aho, Alfred V., et al., "Efficient String Matching: An Aid to Bibliographic Search," Communication of the ACM, Jun. 1975, vol. 18, No. 6, pp. 333-340.

(Continued)

*Primary Examiner* — Michael C Lai
(74) *Attorney, Agent, or Firm* — Meunier Carlin & Curfman

(57) ABSTRACT

A monitoring system monitors traffic flows that are exchanged over a communication network. The system characterizes the flows in terms of their temporal traffic features, and uses this characterization to identify communication devices that participate in the same communication session. By identifying the communication devices that serve as endpoints in the same session, the system establishes correlations between the users of these communication devices. The monitoring system characterizes the flows using traffic features such as flow start time, flow end time, inter-burst time and burst size, and/or statistical properties of such features. The system typically generates compressed-form representations ("signatures") for the traffic flows based on the temporal traffic features, and finds matching flows by finding similarities between signatures.

16 Claims, 2 Drawing Sheets

(56) References Cited

U.S. PATENT DOCUMENTS

| | | | |
|---|---|---|---|
| 6,757,361 | B2 | 6/2004 | Blair et al. |
| 7,134,141 | B2 | 11/2006 | Crosbie |
| 7,216,162 | B2 | 5/2007 | Amit et al. |
| 7,225,343 | B1 | 5/2007 | Honig et al. |
| 7,269,157 | B2* | 9/2007 | Klinker ............... H04L 41/0816 370/228 |
| 7,287,278 | B2 | 10/2007 | Liang |
| 7,466,816 | B2 | 12/2008 | Blair |
| RE40,634 | E | 2/2009 | Blair et al. |
| 7,587,041 | B2 | 9/2009 | Blair |
| 7,769,875 | B1* | 8/2010 | Moisand ............. H04L 67/2804 709/223 |
| RE43,103 | E | 1/2012 | Rozman et al. |
| 8,176,527 | B1 | 5/2012 | Njemanze et al. |
| 8,201,245 | B2 | 6/2012 | Dewey et al. |
| RE43,528 | E | 7/2012 | Rozman et al. |
| RE43,529 | E | 7/2012 | Rozman et al. |
| 8,224,761 | B1 | 7/2012 | Rockwood |
| RE43,987 | E | 2/2013 | Rozman et al. |
| 8,402,543 | B1 | 3/2013 | Ranjan et al. |
| 8,413,244 | B1 | 4/2013 | Nachenberg |
| 8,499,348 | B1 | 7/2013 | Rubin |
| 8,578,493 | B1 | 11/2013 | McFadden |
| 8,682,812 | B1 | 3/2014 | Ranjan |
| 8,762,948 | B1 | 6/2014 | Zaitsev |
| 8,838,951 | B1 | 9/2014 | Hicks et al. |
| 8,839,417 | B1 | 9/2014 | Jordan |
| 8,850,579 | B1 | 9/2014 | Kalinichenko |
| 8,869,268 | B1 | 10/2014 | Barger |
| 2002/0129140 | A1 | 9/2002 | Peled et al. |
| 2003/0097439 | A1 | 5/2003 | Strayer et al. |
| 2005/0018618 | A1 | 1/2005 | Mualem et al. |
| 2005/0041590 | A1 | 2/2005 | Olakangil et al. |
| 2005/0108377 | A1* | 5/2005 | Lee ..................... H04L 63/1408 709/223 |
| 2006/0026680 | A1* | 2/2006 | Zakas .................... H04L 29/06 726/22 |
| 2007/0180509 | A1 | 8/2007 | Swartz et al. |
| 2007/0186284 | A1 | 8/2007 | McConnell |
| 2007/0192863 | A1 | 8/2007 | Kapoor et al. |
| 2007/0294768 | A1 | 12/2007 | Moskovitch et al. |
| 2008/0014873 | A1 | 1/2008 | Krayer et al. |
| 2008/0028463 | A1 | 1/2008 | Dagon et al. |
| 2008/0141376 | A1* | 6/2008 | Clausen ............... G06F 21/566 726/24 |
| 2008/0184371 | A1 | 7/2008 | Moskovitch et al. |
| 2008/0196104 | A1 | 8/2008 | Tuvell et al. |
| 2008/0261192 | A1 | 10/2008 | Huang et al. |
| 2008/0285464 | A1 | 11/2008 | Katzir |
| 2009/0106842 | A1 | 4/2009 | Durie |
| 2009/0150999 | A1 | 6/2009 | Dewey et al. |
| 2009/0158430 | A1 | 6/2009 | Borders |
| 2009/0216760 | A1 | 8/2009 | Bennett |
| 2009/0249484 | A1 | 10/2009 | Howard et al. |
| 2009/0282476 | A1 | 11/2009 | Nachenberg et al. |
| 2010/0002612 | A1 | 1/2010 | Hsu et al. |
| 2010/0037314 | A1 | 2/2010 | Perdisci |
| 2010/0071065 | A1* | 3/2010 | Khan .................... G06F 21/567 726/24 |
| 2010/0100949 | A1 | 4/2010 | Sonwane |
| 2011/0099620 | A1* | 4/2011 | Stavrou ................ G06F 21/566 726/12 |
| 2011/0154497 | A1 | 6/2011 | Bailey |
| 2011/0167494 | A1 | 7/2011 | Bowen et al. |
| 2011/0271341 | A1 | 11/2011 | Satish et al. |
| 2011/0302653 | A1 | 12/2011 | Frantz et al. |
| 2011/0320816 | A1 | 12/2011 | Yao et al. |
| 2012/0017281 | A1 | 1/2012 | Banerjee |
| 2012/0167221 | A1 | 6/2012 | Kang et al. |
| 2012/0174225 | A1 | 7/2012 | Shyamsunder et al. |
| 2012/0222117 | A1 | 8/2012 | Wong et al. |
| 2012/0304244 | A1 | 11/2012 | Xie et al. |
| 2012/0311708 | A1 | 12/2012 | Agarwal et al. |
| 2012/0327956 | A1 | 12/2012 | Vasudevan |
| 2013/0014253 | A1 | 1/2013 | Neou |
| 2013/0333038 | A1 | 12/2013 | Chien |
| 2014/0075557 | A1 | 3/2014 | Balabine et al. |
| 2014/0207917 | A1 | 7/2014 | Tock et al. |
| 2014/0298469 | A1 | 10/2014 | Marion et al. |
| 2015/0135265 | A1* | 5/2015 | Bagrin .................... H04L 63/02 726/1 |
| 2015/0135326 | A1 | 5/2015 | Bailey, Jr. |

OTHER PUBLICATIONS

Altshuler, Y., et al., "How Many Makes a Crowd? On the Evolution of Learning as a Factor of Community Coverage," LNCS 7227, 2012, pp. 43-52.

Altshuler, Y., et al., "Incremental Learning with Accuracy Prediction of Social and Individual Properties from Mobile-Phone Data," IEEE, 2011, 10 pages.

Altshuler, Y., et al., "Trade-Offs in Social and Behavioral Modeling in Mobile Networks," LNCS 7812, 2013, pp. 412-423.

Argamon, S., et al., "Automatically Profiling the Author of an Anonymous Text," Communication of the ACM, vol. 52, No. 2, Feb. 2009, pp. 119-123.

Argamon, S., et al., "Gender, Genre, and Writing Style in Formal Written Texts," Text & Talk, vol. 23, Issue 3, 2003, 32 pages.

Atkinson, M., et al., "Near Real Time Information Mining in Multilingual News," World Wide Web Conference, Apr. 20-24, 2009, 2 pages.

Bailey, M., et al., "Automated Classification and Analysis of Internet Malware," RAID, 2007, pp. 178-197.

Bar-Yanai, R., et al., "Realtime Classification for Encrypted Traffic," Lecture Notes in Computer Science, vol. 6049, 2010, pp. 373-385.

Bayer, U., et al., Scalable, Behavior-Based Malware Clustering, Secure Systems Lab, Technical University, Vienna, 2009, 18 pages.

Bilge, Leyla, et al., "Exposure: Finding Malicious Domains Using Passive DNS Analysis," Feb. 2011, 17 pages.

Cloudshield, Inc., "Lawful Intercept Next-Generation Platform," 2009, 6 pages.

Coffman, T., et al., "Graph-Based Technologies for Intelligence Analysis," CACM, Mar. 2004, 12 pages.

Corney, M., et al. "Gender-Preferential Text Mining of E-mail Discourse," Proceedings of the 18the Annual Computer Security Applications Conference, 2002, 8 pages.

De Vel, O., et al., "Language and Gender Author Cohort Analysis of E-mail for Computer Forensics," Defence Science and Technology Organisation, Australia, 2002, 16 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Dietrich, C.J., et al., "CoCoSpot: Clustering and recognizing botnet command and control channels using traffic analysis," 2012, pp. 475-486.

Eagle, N., et al., "Inferring friendship network structure by using mobile phone data," PNAS, vol. 106, No. 36, 2009, pp. 15274-15278.

Eslahi, M., "botAnalytics: Improving HTTP-Based Botnet Detection by Using Network Behavior Analysis system," Dissertation, Faculty of Computer Science and Information Technology, University of Malaya, 2010, 124 pages.

Estival, D., et al., "Author Profiling for English Emails," Proceedings of the 10th Conference of the Pacific Association for Computational Linguistics, 2007, pp. 263-272.

Fisk, Mike, et al., "Applying Fast String Matching to Intrusion Detection," Los Alamos National Laboratory and University of California San Diego, Jun. 1975, 22 pages.

FoxReplay Analyst, Fox Replay BV, http//www.foxreplay.com, Revision 1.0, Nov. 2007, 5 pages.

FoxReplay Analyst Product Brochure, Fox-IT BV, http//www.foxreplay.com, 2006, 2 pages.

Goldfarb, Eithan, "Mass Link Analysis: Conceptual Analysis," Jun. 24, 2007, Version 1.1, 21 pages.

(56) References Cited

OTHER PUBLICATIONS

Goswami, S., et al., "Stylometric Analysis of Bloggers' Age and Gender," Proceedings of the Third International ICWSM Conference, 2009, pp. 214-217.
Gu, G., et al., "BotMiner: Clustering Analysis of Network Traffic for Protocol- and Structure-Independent Botnet Detection," USENIX Security Symposium, vol. 5, No. 2, XP61009228, 2008, 16 pages.
Gu, G., et al., "BotSniffer: Detecting Botnet Command and Control Channels in Network Traffic," Proceedings of the 15th Annual Network and Distributed System Security Symposium (NDSS'08), San Diego, California, 2008, 18 pages.
Jacob, G., et al., "Jackstraws: Picking Command and Control Connections from Bot Traffic," Proceedings of the 20th Usenix Security Symposium, San Francisco, 2011, 16 pages.
Lakhina, A., et al., "Mining Anomalies Using Traffic Feature Distributions," SIGCOMM, 2005, pp. 217-228.
Livadas, C., et al., "Using Machine Learning Techniques to Identify Botnet Traffic," In 2nd IEEE LCN Workshop on Network Security (WoNS'2006), 2006, pp. 967-974.
Mohrehkesh, S., et al., "Demographic Prediction of Mobile User from Phone Usage," Proceedings Mobile Data Challenge by Nokia Workshop, Newcastle, United Kingdom, 2012, 4 pages.
Navarro, Gonzalo, et al., "Flexible Pattern Matching in Strings: Practical On-Line Search Algorithms for Texts and Biological Sequences," Cambridge University Press, 2002, 166 pages.
Netronome SSL Inspector Solution Overview White Paper, "Examining SSL-encrypted Communications," 2010, 8 pages.
Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.
Rangel, F., et al., "Overview of the Author Profiling Task at PAN 2013," CLEF 2013 Evaluation Labs, 2013, 13 pages.
Rieck, K., et al., "Botzilla: Detecting the 'Phoning Home' of Malicious Software," Proceedings of the ACM Symposium on Applied Computing (SAC), Sierre, Switzerland, 2010, 7 pages.
Rohde & Schwarz GmbH & Co. KG, "ACCESSNET-T, DMX-500 R2, Digital Mobile eXchange," Product Brochure, Secure Communications, Mar. 2000, 4 pages.
Rohde & Schwarz GmbH & Co. KG, "ACCESSNET-T IP," Product Brochure, Secure Communications, Jan. 2000, 4 pages.
Rohde & Schwarz GmbH & Co. KG, "R&S AllAudio Integrated Digital Audio Software," Product Brochure, Radiomonitoring & Radiolocation, Feb. 2000, 12 pages.
Rohde & Schwarz GmbH & Co. KG, "R&S AllAudio Integrierte digitale Audio-Software," Product Brochure, Feb. 2002, 12 pages.
Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.
Rohde & Schwarz GmbH & Co. KG, "R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.
Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.
Rohde & Schwarz GmbH & Co. KG, "Integrated Digital Audio Software R&S AllAudio," Specifications, 2000, 8 pages.
Rohde & Schwarz GmbH & Co. KG, "R&S RA-CM Continuous Monitoring Software," Product Brochure, Radiomonitoring & Radiolocation, Jan. 2001, 16 pages.
Rohde & Schwarz GmbH & Co. KG, "R&S RaMON COMINT/CESM Software," Product Brochure, Radiomonitoring & Radiolocation, Jan. 2000, 22 pages.
Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.
Schulzrinne, H., et al., "RTP: A Transport Protocol for Real-Time Applications," Standards Track, Jul. 2003, 89 pages.
Sheng, Lei, et al., "A Graph Query Language and Its Query Processing," IEEE, Apr. 1999, pp. 572-581.
Soghoian, Christopher, et al., "Certified Lies: Detecting and Defeating Government Interception Attacks Against SSL," 2010, 19 pages.
Stamatatos, E., "Author identification: Using text sampling to handle the class imbalance problem," Science Direct, Information Processing and Management, vol. 44, 2008, pp. 790-799.
Svenson, Pontus, et al., "Social network analysis and information fusion for anti-terrorism," CIMI, 2006, 8 pages.
Thonnard, O., et al., "Actionable Knowledge Discovery for Threats Intelligence Support Using a Multi-Dimensional Data Mining Methodolgy," 2008 IEEE International Conference on Data Mining Workshops, 2008, pp. 154-163.
Tongaonkar, Alok S., "Fast Pattern-Matching Techniques for Packet Filtering," Stony Brook University, May 2004, 44 pages.
Verint Systems Inc., "Mass Link Analysis: Solution Description," Dec. 2008, 16 pages.
Wang, H., et al., "NetSpy: Automatic Generation of Spyware Signatures for NIDS," Proceedings of the 22nd Annual Computer Security Applications Conference, Miami Beach, Florida, Dec. 2006, ten pages.
Yu, Fang, et al., "Fast and Memory-Efficient Regular Expression Matching for Deep Packet Inspection," ANCS'06, San Jose, California, Dec. 3-5, 2006, 10 pages.
Yu, Fang, et al., "Gigabit Rate Packet Pattern-Matching Using TCAM," Proceedings of the 12th IEEE International Conference on Network Protocols (ICNP'04), 2004, 10 pages.
Zhang, Y., et al., "Detecting Stepping Stones," Proceedings of the 9th USENIX Security Symposium, Denver, Colorado, 2000, 11 pages.
European Search Report and Preliminary Opinion, dated Mar. 24, 2014, received in connection with corresponding European Application No. 13189920.
European Search Report and Preliminary Opinion, dated Jan. 15, 2014, received in connection with corresponding European Application No. 13165912.

* cited by examiner

SYSTEM AND METHOD FOR IDENTIFYING COMMUNICATION SESSION PARTICIPANTS BASED ON TRAFFIC PATTERNS

FIELD OF THE DISCLOSURE

The present disclosure relates generally to communication monitoring, and particularly to methods and systems for identifying participants of communication sessions.

BACKGROUND OF THE DISCLOSURE

Various communication analysis techniques analyze and classify communication traffic based on behavioral characteristics rather than content. Such techniques are useful, for example, for analyzing encrypted traffic. For example, Bar Yanai et al. describe a statistical classifier for real-time classification of encrypted data, in "Realtime Classification for Encrypted Traffic," Experimental Algorithms, Lecture Notes in Computer Science, Volume 6049, May, 2010, which is incorporated herein by reference.

As another example, Zhang and Paxson describe an algorithm for detecting "stepping stones"—intermediary hosts that are used for launching hostile network attacks, in "Detecting Stepping Stones," Proceedings of the 9th USENIX Security Symposium, August, 2000, which is incorporated herein by reference. The algorithm is based on distinctive characteristics, e.g., packet size and timing, of interactive traffic, and not on connection contents.

SUMMARY OF THE DISCLOSURE

An embodiment that is described herein provides a method including monitoring a plurality of traffic flows exchanged over a communication network. Respective temporal traffic features are determined for the monitored traffic flows. Communication devices that participate in a same communication session are identified, by finding a match between respective temporal traffic features of the traffic flows exchanged by the communication devices.

In some embodiments, determining the temporal traffic features includes generating a respective compressed-form traffic signature for each of the traffic flows, and finding the match includes comparing between traffic signatures of at least some of the traffic flows exchanged by the communication devices. In an embodiment, the temporal traffic features depend on at least one feature type selected from a group of types consisting of start time, end time, inter-burst time, burst size and overall data volume.

In a disclosed embodiment, identifying the communication devices includes detecting the match even though the communication devices communicate via at least one intermediary server. The intermediary server may perform transcoding between the traffic flows of the communication devices. In an embodiment, identifying the communication devices includes selecting a subset of the traffic flows that are associated with a given application type, and searching for the match only among the traffic flows in the subset.

In some embodiments, finding the match includes matching the traffic features between an inbound traffic flow of a first communication device and an outbound traffic flow of a second communication device. In an example embodiment, the method includes reaffirming the match by matching the traffic features between an outbound traffic flow of the first communication device and an inbound traffic flow of the second communication device.

In another embodiment, finding the match includes matching activity periods in a first traffic flow with silence periods in a second traffic flow. In yet another embodiment, identifying the communication devices includes finding multiple matches between the communication devices over multiple communication sessions. In still another embodiment, determining the temporal traffic features and finding the match are performed independently of content of the traffic flows. In some embodiments, at least some of the traffic flows are encrypted.

There is additionally provided, in accordance with an embodiment that is described herein, an apparatus including an interface and a processor. The interface is configured to monitor a plurality of traffic flows exchanged over a communication network. The processor is configured to determine respective temporal traffic features for the monitored traffic flows, and to identify communication devices that participate in a same communication session, by finding a match between the temporal traffic features of the traffic flows exchanged by the communication devices.

The present disclosure will be more fully understood from the following detailed description of the embodiments thereof, taken together with the drawings in which:

DETAILED DESCRIPTION OF EMBODIMENTS

Overview

Figure 1:
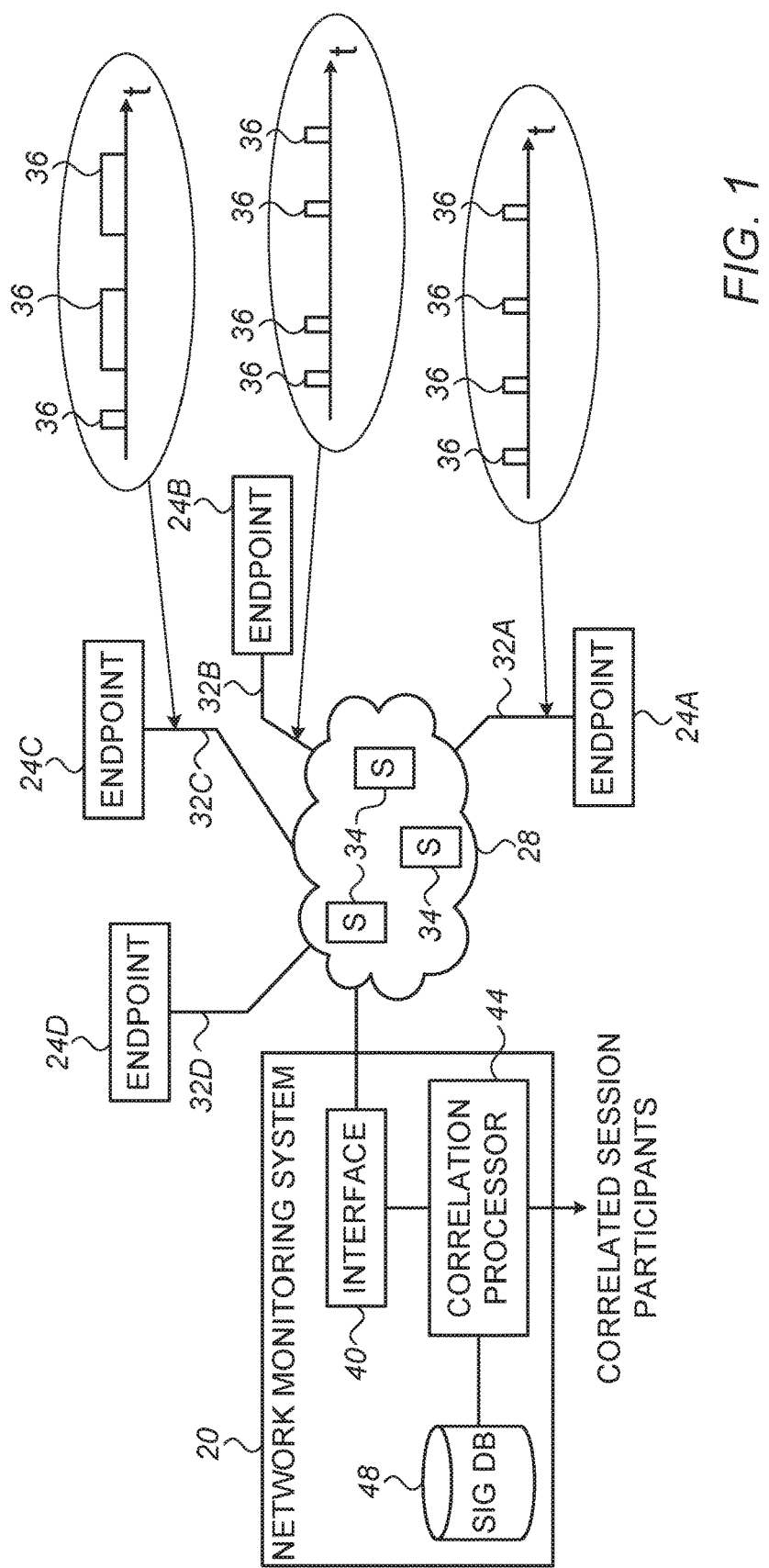
FIG. 1 is a block diagram that schematically illustrates a network monitoring system, in accordance with an embodiment that is described herein.

Embodiments that are described hereinbelow provide improved methods and systems for monitoring communication networks. In some embodiments, a monitoring system monitors traffic flows that are exchanged over a communication network. The system characterizes the flows in terms of their temporal traffic features, and uses this characterization to identify communication devices, e.g., computers or mobile phones, that participate in the same communication session. By identifying the communication devices that serve as endpoints in the same session, the system establishes correlations between the users of these communication devices.

In an embodiment, the monitoring system characterizes the flows using traffic features such as flow start time, flow end time, inter-burst time and burst size, and/or statistical properties of such features. The system typically generates compressed-form representations ("signatures") for the traffic flows based on the temporal traffic features, and finds matching flows by finding similarities between signatures.

By using compressed-form representations of the flows, the system is able to handle large volumes of traffic flows, either in real-time or off-line. Since the disclosed techniques analyze temporal traffic patterns, usually regardless of the underlying content, they are highly effective in monitoring encrypted traffic flows.

In a typical embodiment, the system regards two devices as suspected of participating in the same session upon matching the outbound traffic of one device with the inbound traffic of the other. The system may increase the confidence level of the match by correlating the opposite-direction flows, i.e., the inbound traffic of the first device and the outbound traffic of the second device. It is also possible to correlate flows of opposite directions, e.g., by correlating activity periods in one direction with silence periods in the opposite direction. The system may also increase the confidence level over time, e.g., by finding several matches between the same pair of devices over multiple sessions.

The embodiments described herein refer mainly to two-party sessions, for the sake of clarity. The disclosed techniques, however, can be used in a similar manner to correlate communication devices participating in multi-party sessions, such as conference calls.

In some embodiments, the system selects a particular application, e.g., Skype, and attempts to match only flows of that application. This mechanism improves the likelihood of success, reduces computational complexity, and also enables the system to focus on traffic features that are known to be effective for the specific application.

Some of the disclosed techniques allow for approximate matching of traffic features, not necessarily exact matching. Approximate matching is important because the network often introduces variations between the temporal patterns of the traffic observed at the two ends of a session. For example, a session is often conducted via an intermediate server that applies transcoding or other processes that affect the temporal traffic features.

In summary, the methods and systems described herein provide highly efficient, scalable and content-independent means for identifying session participants.

System Description

FIG. 1 is a block diagram that schematically illustrates a network monitoring system 20, in accordance with an embodiment that is described herein. System 20 monitors traffic that is exchanged among endpoints 24 over a communication network 28. By analyzing the monitored flows, system 20 identifies pairs of endpoints that participate in the same communication session. Correlating endpoints via the communication sessions they conduct is useful, for example, for linking the users of these endpoints.

Network 28 may comprise, for example, a Wide-Area Network (WAN) such as the Internet, a Local Area Network (LAN), a wireless network such as a cellular network, or any other suitable network or combination of networks. Typically, although not necessarily, network 28 comprises an Internet Protocol (IP) network.

Endpoints 24 may comprise any suitable wireline or wireless communication devices, such as fixed or mobile phones or computers. The terms "endpoints" and "communication devices" are used interchangeably herein. FIG. 1 shows only four endpoints 24A . . . 24D, for the sake of clarity. Real-life networks typically comprises a large number of endpoints. In the present example, endpoints 24A . . . 24D are connected to network 28 using respective links 32A . . . 32D.

Typically, endpoints 24 communicate over network 28 by exchanging packets with one another, often via one or more intermediate servers 34. Servers 34 may comprise, for example, proxies, transcoding servers, or any other suitable server type. The traffic between endpoints also typically traverses network elements such as switches or routers.

When observed over a given link 32, the outbound or inbound traffic flow of a given endpoint 24 appears as a sequence of traffic bursts 36. Each traffic burst may comprise one or more packets. As will be explained below, system 20 finds endpoints 24 that are suspected of participating in the same communication session by finding similarities between the temporal patterns of their traffic flows.

In the present example, system 20 comprises an interface 40 for monitoring traffic flows in network 28, a correlation processor 44 that carries out the methods described herein, and a signature database 48 for storing compressed-form signatures of flows. Interface 40 may comprise, for example, one or more network probes that monitor one or more internal interfaces in network 28.

The system configuration shown in FIG. 1 is an example configuration that is chosen purely for the sake of conceptual clarity. In alternative embodiments, any other suitable system configuration can be used. Certain elements of system 20 can be implemented using hardware, such as using one or more Application-Specific Integrated Circuits (ASICs), Field-Programmable Gate Arrays (FPGAs) or other device types. Signature database 48 can be implemented using any suitable memory or storage device. Additionally or alternatively, certain elements of system 20 can be implemented using software, or using a combination of hardware and software elements.

In some embodiments, processor 44 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Associating Session Participants Based on Temporal Traffic Features

In some embodiments, processor 44 monitors the traffic flows that are transmitted and received by various endpoints 24 over network 28. Processor 44 attempts to find flows in which the temporal patterns of bursts 36 are similar. Such similarity may indicate that the flows (and therefore the endpoints and their users) belong to the same communication session.

In an embodiment, the system defines a flow as a stream of packets having a common 5-tuple, i.e., having the same source IP address, source port number, destination IP address, destination port number and protocol. In other embodiments, other suitable flow definitions can be used. For example, a flow may be defined as comprising two or more different packet streams or even connections, e.g., a separate voice connection and file-transfer connection between the participants of the same session.

In the present context, the term "communication session" refers to various types of interactions between endpoints, using various types of applications. Communication session may comprise, for example, voice-over-IP, video-over-IP, instant messaging, chat or file transfer. A given session may comprise a combination of multiple such interaction types.

Some sessions may comprise peer-to-peer sessions that are conducted directly between endpoints 24. Other sessions (e.g., Viber, Skype or Whatsapp sessions) may be processed by one or more intermediate servers 34. In some cases, an intermedia server applies transcoding to the traffic, and therefore the endpoints of the same session may use different protocols or applications. Moreover, in many cases the traffic conveyed by the flows is encrypted. In some embodiments, processor 44 finds similarities between flows even though the session traverses one or more intermediate servers 34, and even though the underlying traffic is encrypted.

In some embodiments, processor 44 computes a compressed-form signature for each of the monitored flows. The flow signature specifies one or more temporal features of the flow, such as the flow start time, flow end time, burst size, inter-burst time and/or overall data volume. Other temporal features may comprise statistical properties of temporal features, for example a variance of the packet size, a variance of the inter-packet time, or a maximal, minimal or average value of some temporal feature. Additionally or alternatively, any other suitable type of temporal feature can be used. Processor 44 typically stores the flow signatures in database 48. When a session comprises multiple flows (e.g., both voice and file transfer), processor 44 may monitor any or all of these flows.

Processor 48 searches over database 48, and attempts to find flows having similar signatures. A pair of flows having similar traffic features may indicate that the flows belong to the same session, and therefore that the users of the corresponding endpoints may be linked or affiliated in some way.

In practice, a one-time match between two flows may not always provide sufficient confidence that the endpoints are indeed linked. Therefore, in some embodiments processor 48 looks for multiple matches, i.e., multiple sessions in which the same pair of endpoints is suspected of serving as endpoints.

Processor 48 may take various actions upon identifying a pair of endpoints that are regarded as endpoints to the same session. The processor may output the association between endpoints to a user, trigger an alert, transfer the association to another system for further processing, or take any other suitable action.

Typically, when comparing signatures, processor 44 uses a metric that permits approximate matching of traffic features between flows. By allowing approximate matching, processor 44 is able to match flows even when the traffic is processed and modified by intermediate servers or by the network in general. Additionally or alternatively, processor 44 may assign ranks to the matches between signatures, or to the correlations between endpoints, which quantify the quality, strength or confidence of the match.

Consider, for example, an implementation in which the flow signatures specify the flow time span (start time and end time), the overall traffic volume, and the mean and variance of the inter-burst time. In an embodiment, processor 44 regards two flows as matching if their above-listed traffic features differ by no more than a certain threshold, e.g., 10%. In some embodiments, the processor may define different tolerable variations for different traffic features.

In some embodiments, processor 44 looks for similarities between the signatures of opposite-direction flows, i.e., between the signature of the outbound traffic of one device and the signature of the inbound traffic of another device. Processor 44 may increase the confidence level of such a match by also correlating the opposite-direction flows, i.e., the inbound traffic of the first device and the outbound traffic of the second device.

Additionally or alternatively, processor 44 may correlate flows of opposite directions, e.g., two outbound flows or two inbound flows. For example, processor 44 may find two outbound flows in which activity periods in one flow are highly correlative with silence periods in the other flow. This sort of correlation may also indicate that the two flows belong to the same session.

In some embodiments, processor 44 first chooses a certain application, and narrows down the matching process to flows of that application. It is often to identify and select flows of a given application without having to decode the actual content being transferred. For example, flows of real-time video and voice applications often have a similar burst rate, similar burst size, similar activity duty cycle, or any other suitable similarity. As another example, flows of a file transfer application may have a similar burst size.

Flows of real-time chat applications are often similar to real-time video or voice, but with smaller traffic volume. Chat applications are also often characterized by notifications that indicate that a message was received by the opposite endpoint, or that the opposite user is typing. Further alternatively, processor 44 may classify flows to applications in any other suitable way.

Having focused on the flows of a given application, processor 44 compares signatures within these flows. Such a technique improves the likelihood of success, and also improves the capability to process large numbers of flows. Moreover, processor 44 is able to compare traffic features that are known to be effective for the specific application. In some embodiments, the definition of the signature depends on the application type. In other words, processor 44 may compare flows of one application using a certain signature, and flows of another application using a different signature.

Figure 2:
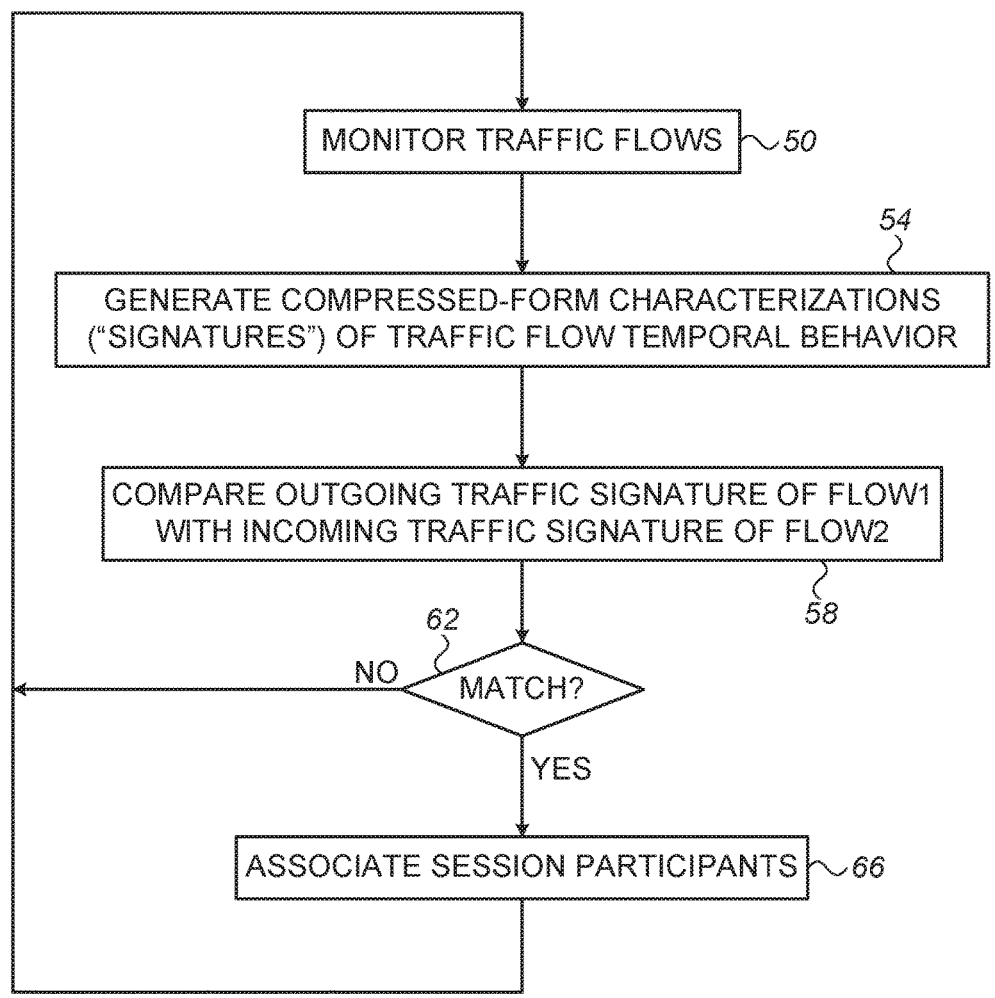
FIG. 2 is a flow chart that schematically illustrates a method for associating communication session participants, in accordance with an embodiment that is described herein.

FIG. 2 is a flow chart that schematically illustrates a method for associating communication session participants, in accordance with an embodiment that is described herein. The method begins with system 20 monitoring traffic flows in network 28 using interface 40, at a monitoring step 50. Processor 44 of system 20 generates compressed-form signatures for the monitored flows, at a signature generation step 54.

Processor 44 compares the signature of the outgoing traffic of one communication device 24 with the signature of the outgoing traffic of another communication device 24, at a comparison step 58. If the two signatures are found to match, as checked at a checking step 62, processor 44 associates the two endpoints, at an association step 66. In some embodiments, processor 44 first compares flow signatures and, upon finding a match, reverts to a more exact and in-depth comparison of the flows on a per-packet basis.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for identifying communication devices that serve as endpoints in the same communication session and for establishing correlations between the users of the communication devices, the method comprising:
    monitoring a plurality of traffic flows exchanged over a communication network;
    determining respective temporal traffic features for the monitored traffic flows;
    identifying communication devices that participate in a same communication session, by finding a match among respective temporal traffic features of the traffic flows exchanged by the communication devices;

wherein determining the temporal traffic features comprises generating a respective compressed-form signature for each of the traffic flows, and wherein finding the match comprises comparing among signatures of at least some of the traffic flows exchanged by the communication devices; and wherein finding the match comprises matching the temporal traffic features between an inbound traffic flow of a first communication device and an outbound traffic flow of a second communication device.

2. The method according to claim 1, wherein the temporal traffic features depend on at least one feature type selected from a group of types consisting of start time, end time, inter-burst time, burst size and overall data volume.

3. The method according to claim 1, wherein identifying the communication devices comprises detecting the match even though the communication devices communicate via at least one intermediary server.

4. The method according to claim 3, wherein the intermediary server performs transcoding among the traffic flows of the communication devices.

5. The method according to claim 1, wherein identifying the communication devices comprises selecting a subset of the traffic flows that are associated with a given application type, and searching for the match only among the traffic flows in the subset.

6. The method according to claim 1, and comprising reaffirming the match by matching the temporal traffic features between an outbound traffic flow of the first communication device and an inbound traffic flow of the second communication device.

7. The method according to claim 1, wherein finding the match comprises matching activity periods in a first traffic flow with silence periods in a second traffic flow.

8. The method according to claim 1, wherein identifying the communication devices comprises finding multiple matches among the communication devices over multiple communication sessions.

9. The method according to claim 1, wherein determining the temporal traffic features and finding the match are performed independently of content of the traffic flows.

10. The method according to claim 1, wherein at least some of the traffic flows are encrypted.

11. Apparatus for identifying communication devices that serve as endpoints in the same communication session and for establishing correlations between the users of the communication devices, the apparatus comprising:

an interface, which is configured to monitor a plurality of traffic flows exchanged over a communication network;

a processor, which is configured to determine respective temporal traffic features for the monitored traffic flows, and to identify communication devices that participate in a same communication session, by finding a match among the temporal traffic features of the traffic flows exchanged by the communication devices;

wherein the processor is configured to generate a respective compressed-form signature for each of the traffic flows, and to find the match by comparing among signatures of at least some of the traffic flows exchanged by the communication devices; and wherein the processor is configured to find the match by matching the temporal traffic features between an inbound traffic flow of a first communication device and an outbound traffic flow of a second communication device.

12. The apparatus according to claim 11, wherein the processor is configured to find the match even though the communication devices communicate via at least one intermediary server.

13. The apparatus according to claim 12, wherein the intermediary server performs transcoding among the traffic flows of the communication devices.

14. The apparatus according to claim 11, wherein the processor is configured to select a subset of the traffic flows that are associated with a given application type, and to search for the match only among the traffic flows in the subset. device and an outbound traffic flow of a second communication device.

15. The apparatus according to claim 11, wherein the processor is configured to reaffirm the match by matching the temporal traffic features between an outbound traffic flow of the first communication device and an inbound traffic flow of the second communication device.

16. The apparatus according to claim 11, wherein the processor is configured to find multiple matches among the communication devices over multiple communication sessions.

\* \* \* \* \*